United States Patent
Naruse

(10) Patent No.: US 10,668,675 B2
(45) Date of Patent: Jun. 2, 2020

(54) FLAT TIRE REPAIR LIQUID CONTAINER

(71) Applicant: The Yokohama Rubber Co., LTD., Minato-ku, Tokyo (JP)

(72) Inventor: Masahiro Naruse, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 92 days.

(21) Appl. No.: 15/766,687

(22) PCT Filed: Sep. 12, 2016

(86) PCT No.: PCT/JP2016/076842
§ 371 (c)(1),
(2) Date: Apr. 6, 2018

(87) PCT Pub. No.: WO2017/061237
PCT Pub. Date: Apr. 13, 2017

(65) Prior Publication Data
US 2018/0290406 A1    Oct. 11, 2018

(30) Foreign Application Priority Data
Oct. 7, 2015    (JP) .................................. 2015-199600

(51) Int. Cl.
*B29C 73/02*    (2006.01)
*B29C 73/16*    (2006.01)
(Continued)

(52) U.S. Cl.
CPC .......... *B29C 73/025* (2013.01); *B29C 73/166* (2013.01); *B60C 25/16* (2013.01); *B60S 5/04* (2013.01)

(58) Field of Classification Search
CPC ..... B29C 73/166; B60S 5/046; B29L 2030/00
(Continued)

(56) References Cited

U.S. PATENT DOCUMENTS 7,854,242 B2    12/2010    Stehle
2007/0181209 A1    8/2007    Stehle
(Continued)

FOREIGN PATENT DOCUMENTS

DE    20 2011 051 522    1/2012
DE    10 2012 108 822    3/2013
(Continued)

OTHER PUBLICATIONS

International Search Report for International Application No. PCT/JP2016/076842 dated Nov. 8, 2016, 4 pages, Japan.

*Primary Examiner* — P. Macade Nichols
(74) *Attorney, Agent, or Firm* — Thorpe North & Western

(57) ABSTRACT

A puncture repair liquid holding container formed from a container main body provided with a holding portion and opening portion, and a cap attached to the opening portion, includes: a first flow channel for the cap to introduce compressed air from outside the container, where the first flow channel is configured from a straight portion and branched portion, a closing plug having a shape that blocks the straight portion is slidably inserted in the straight portion, and switching is possible between a closed condition where the closing plug is positioned above the branched portion or closer to an opening end side of the straight portion than the branched portion such that the first flow channel is closed, and an opened portion where the closing plug is positioned more to a closing end side of the straight portion than the branched portion such that the first flow channel is opened.

8 Claims, 7 Drawing Sheets

(51) Int. Cl.
*B60C 25/00* (2006.01)
*B60S 5/04* (2006.01)

(58) Field of Classification Search
USPC .......................................................... 141/38
See application file for complete search history.

(56) References Cited

U.S. PATENT DOCUMENTS

| | | | |
|---|---|---|---|
| 2013/0068346 A1 | 3/2013 | Ji | |
| 2014/0224380 A1 | 8/2014 | Kono | |
| 2015/0151594 A1* | 6/2015 | Hong | ................... B60C 25/16 |
| | | | 141/38 |
| 2016/0082676 A1* | 3/2016 | Wang | ................... B05B 7/2402 |
| | | | 141/38 |
| 2017/0043545 A1 | 2/2017 | Naruse | |

FOREIGN PATENT DOCUMENTS

| | | |
|---|---|---|
| JP | 2007-210678 | 8/2007 |
| JP | 2013-067161 | 4/2013 |
| JP | 5682722 | 3/2015 |
| WO | WO 2013/040880 | 3/2013 |
| WO | WO 2013/047420 | 4/2013 |
| WO | WO 2015/159828 | 10/2015 |

\* cited by examiner

FLAT TIRE REPAIR LIQUID CONTAINER

TECHNICAL FIELD

The present technology relates to a puncture repair liquid holding container, and particularly relates to a puncture repair liquid holding container that can prevent liquid leaking during storage and prevent clogging of a flow channel.

BACKGROUND ART

In recent years, when a tire mounted to a vehicle is punctured, a puncture repair liquid is injected into the tire through a tire valve to temporarily repair the puncture. An example of a device capable of temporary repair includes a puncture repair kit. When the puncture repair kit is used, the need to provide a vehicle with a spare tire is eliminated, and thus resource saving and vehicle weight reduction are possible. Furthermore, there is an advantage where a spare tire mounting space in a vehicle can be utilized for another purpose.

An example of a known puncture repair kit includes a so-called pump-type puncture repair kit that injects a puncture repair liquid held in a puncture repair liquid holding container into a tire by compressed air supplied from an air compressor or the like. The puncture repair liquid holding container used in the pump-type puncture repair kit is configured from: a container main body provided with an opening portion and a holding portion where puncture repair liquid is held; and a cap attached to the opening portion of the container main body. Furthermore, the cap is provided with a first flow channel for introducing compressed air from outside the container, and a second flow channel for discharging the puncture repair liquid inside the container. At this time, there is a proposal to provide the first flow channel with a closing plug that opens the flow channel based on pressure of air fed into the container during puncture repair in order to prevent the puncture repair liquid from leaking from a flow channel during storage (for example, refer to U.S. Pat. No. 7,854,242). However, the closing plug proposed in U.S. Pat. No. 7,854,242 opens the flow channel by falling into the container main body by pressure of air fed into the container during puncture repair, and therefore, there is a problem where the closing plug may block the second flow channel by entering the second flow channel along with the puncture repair liquid, and thus injection of the puncture repair liquid may be hindered.

SUMMARY

The present technology provides a puncture repair liquid holding container that can prevent liquid leaking during storage and prevent clogging of a flow channel.

A puncture repair liquid holding container of the present technology is formed from: a container main body provided with a holding portion where puncture repair liquid is held, and an opening portion; and a cap attached to the opening portion, including: a first flow channel for the cap to introduce compressed air from outside the container; and a second flow channel for discharging the puncture repair liquid inside the container; where the first flow channel is configured from a straight portion and a branched portion, the straight portion is provided with an opening end for opening to the outside of the container and a closing end for ending at the inside of the cap, the branched portion is provided with a connecting end for connecting a middle portion of the straight portion and an opening end facing towards the inside of the container main body, a closing plug having a shape that blocks the straight portion is slidably inserted in the straight portion, and switching is possible between a closed condition where the closing plug is positioned above the branched portion or closer to an opening end side of the straight portion than the branched portion such that the first flow channel is closed, and an opened condition where the closing plug is positioned more to a closing end side of the straight portion than the branched portion such that the first flow channel is opened.

In the present technology, as described above, a first flow channel is configured from a straight portion and branched portion, the closing plug having a shape that blocks the straight portion is slidably inserted in the straight portion, and switching is possible from the aforementioned closed condition to the opened condition is possible by utilizing compressed air introduced into the first flow channel, and therefore, the first flow channel can be opened without the closing plug falling inside the container main body in the opened condition, while liquid leaking is reliably prevented in the closed condition. Therefore, the closing plug can be reliably prevented from blocking a flow channel during puncture repair work.

In the present technology, the closing plug is preferably configured from an elastomer. Thereby, the closing plug deforms based on the shape inside the first flow channel (inside straight portion), and thus the first flow channel can be reliably closed.

In the present technology, a length L of the closing plug is preferably larger than an opening diameter of the branched portion to the straight portion, and the closing plug is preferably positioned on the branched portion in the closed condition so as to block a connecting end of the branched portion. Thereby, in a case where the internal pressure of the container increases due to a temperature change or the like during storage, the increased internal pressure of the container is applied upward from below the closing plug through the branched portion, and therefore, the closing plug moves to an opening end side of the straight portion due to the pressure, thus closing of the first flow channel by the closing plug can be prevented from becoming inhibited.

At this time, in the closed condition, a protrusion length W1 of a portion protruding more to an opening end side of the straight portion than the branched portion of the closing plug and the protrusion length W2 of a portion protruding more to a closing end side of the straight portion than the branched portion of the closing plug preferably satisfy the relationship W1≥W2. Thereby, the position of the closing plug with regard to the branched portion in the closed condition is optimized, the closing plug moves to the opening end side in a case where the internal pressure of the container increases due to temperature change or the like during storage, and thus closing of the first flow channel by the closing plug can be reliably prevented from becoming inhibited.

In the present technology, the closing plug preferably forms a cylindrical shape having at least one recessed portion at a middle portion, and an outer diameter r1 of the closing plug on an opening end side of the straight portion, an outer diameter r2 of the closing plug on a closing end side of the straight portion, and an outer diameter r3 of the closing plug on the recessed portion preferably satisfy the relationship r1≥r2≥r3. Thereby, a contact area with regard to the straight portion of closing plug is reduced, and thus the closing plug can smoothly slide inside the straight portion.

In this present technology, a tube extending toward the inside of the container main body is preferably attached to the second flow channel, and the tube is preferably sealed by a sealing film with an elongation at break of 100% to 300%. Thereby, the second flow channel is also provided with a sealing film that seals the flow channel, and therefore, liquid leaking during storage (leaking from the second flow channel) can be prevented. Furthermore, the elongation at break of the sealing film is 100% to 300%, and therefore, a sealed condition can be maintained when the internal pressure changes due to temperature change during storage, and the sealing film can break due to the internal pressure of the container increased when compressed air is fed into the container by a high pressure air feeding device during puncture repair work, and thus the second flow channel can be opened. Note that in the present technology, the elongation at break is measured in accordance with JIS (Japanese Industrial Standard) K 6251.

DETAILED DESCRIPTION

A configuration of the present technology is described in detail below while referring to the attached drawings.

Figure 1:
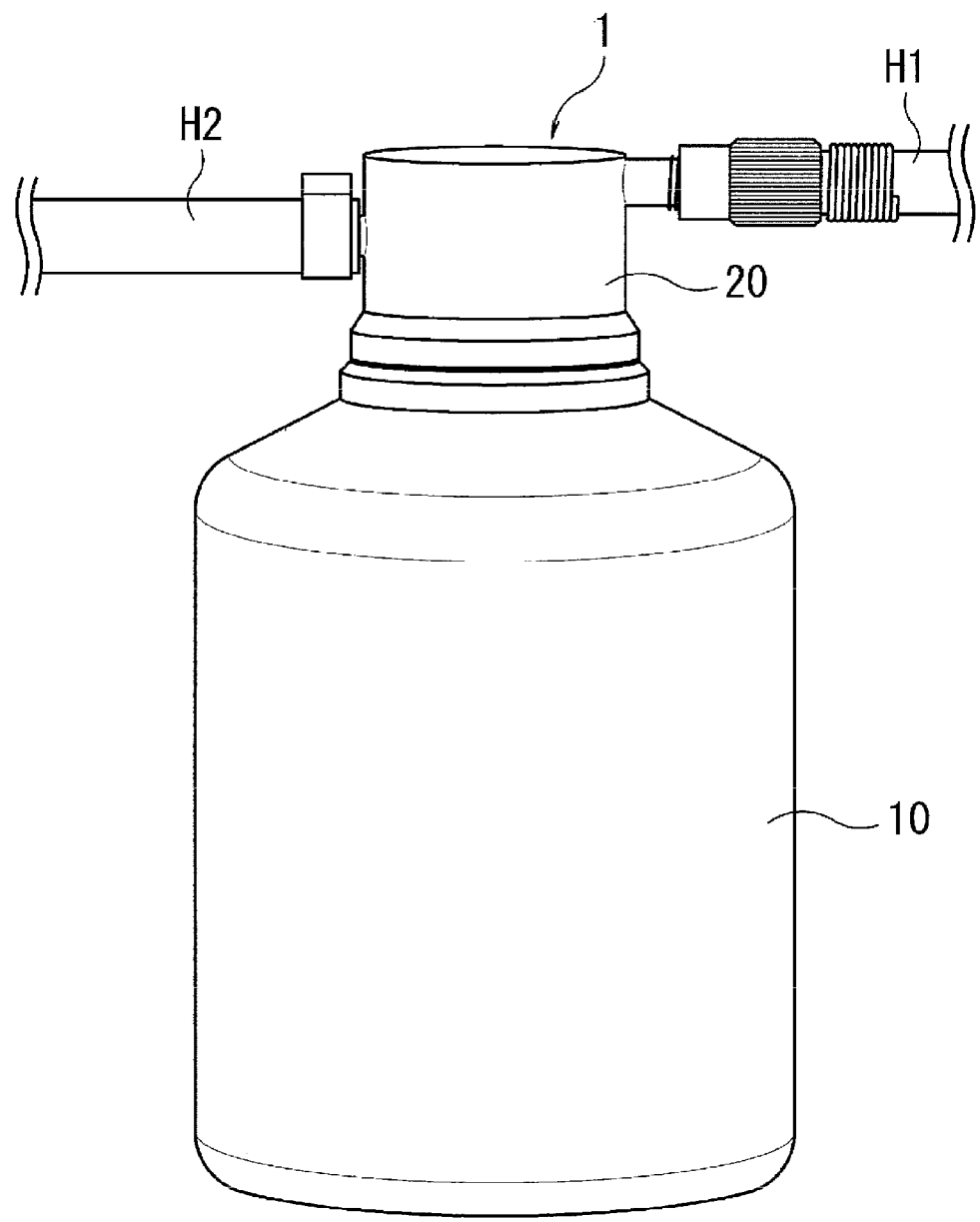
FIG. 1 is a perspective view illustrating an example of a puncture repair liquid holding container according to an embodiment of the present technology.
Figure 2:
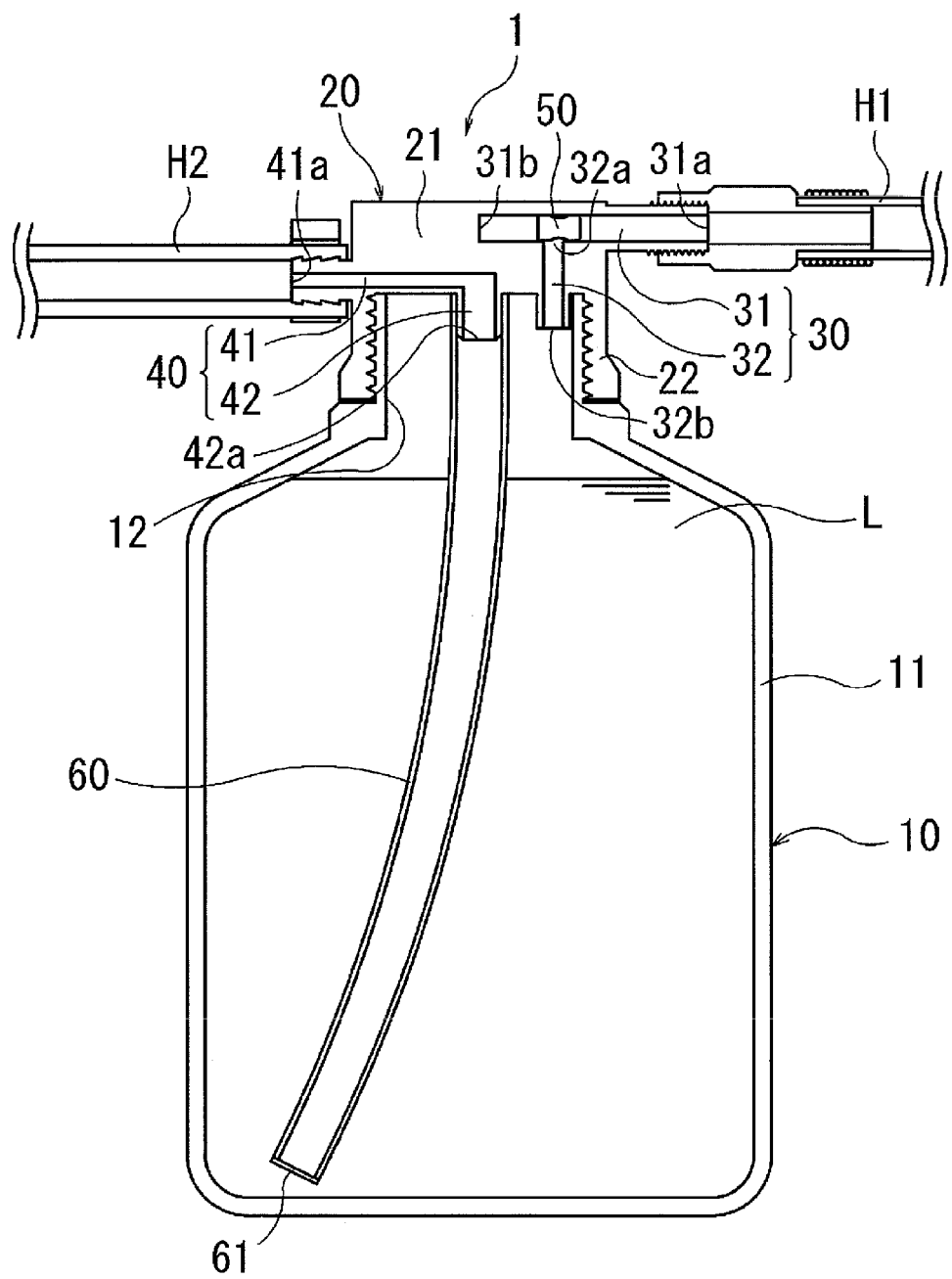
FIG. 2 is a cross-sectional view of the puncture repair liquid holding container in FIG. 1.

As illustrated in FIGS. 1 and 2, a puncture repair liquid holding container 1 of the present technology (hereinafter, referred to as "container 1") is configured from a container main body 10 and a cap 20. Note that FIGS. 1 and 2 illustrate a hose H1 for connecting the container 1 with a high pressure air feeding device, and a hose H2 for the container 1 with a tire, but the structure of the hoses H1, H2 is not particularly limited in the present technology, and therefore, a detailed description will be omitted.

As illustrated in FIGS. 1 and 2, the container main body 10 has an substantially cylindrical shaped holding portion 11 that holds puncture repair liquid L (hereinafter, referred to as "repair liquid L") containing rubber latex, and a cylindrical opening portion 12 positioned on an upper side of the holding portion 11 when the container main body 10 is erected, and where the puncture repair liquid L is discharged during use, for example. When the holding container 1 is erected, a bottom surface of the holding portion 11 is positioned on an opposite side from the opening portion 12. In this embodiment, screw thread cutting is performed on an outer circumferential surface of the opening portion 12 so as to mate with a screw on a cap 20 side described later. The holding portion 11 and opening portion 12 are integrally configured from a synthetic resin such as polypropylene, polyethylene, or the like. Note that before the cap 20 described later, the opening portion 12 may be sealed by a film not illustrated in the drawings such that the repair liquid L in the container is prevented from degrading and the repair liquid L is prevented from leaking from the opening portion 12.

As illustrated in FIGS. 1 to 5, the cap 20 is configured from an substantially cylindrical base portion 21, and a mounting portion 22 forming an substantially cylindrical shape of the same outer diameter as the base portion 21, where screw thread cutting for mating with a screw on the opening portion 12 side is performed on an inner circumferential surface thereof. The base portion 21 is provided with a first flow channel 30 for introducing compressed air from outside the container, and a second flow channel 40 for discharging the puncture repair liquid inside the container, as holes penetrating the inside of the base portion 21.

As illustrated in the drawings, the first flow channel 30 is configured from a straight portion 31 extending in a direction orthogonal to an axis of the container 1, and a branched portion 32 branching from a middle portion of the straight portion 31, and extending in an axial direction of the container 1. The straight portion 31 is provided with an opening end 31a that opens outside of the container, and a closing end 31b that ends inside the cap 20 (base portion 21). In the illustrated example, the opening end 31a of the straight portion 31 protrudes from the base portion 21 such that a hose for connecting the container 1 with the feeding device can be connected. The branched portion 32 is provided with a connecting end 32a that connects to the straight portion 31, and an opening end 32b that opens towards the inside of the container main body 10 (holding portion 11). In the illustrated example, the opening end 32b of the branched portion 32 protrudes toward an inner side of the container main body 10 from the base portion 21.

Figure 3:
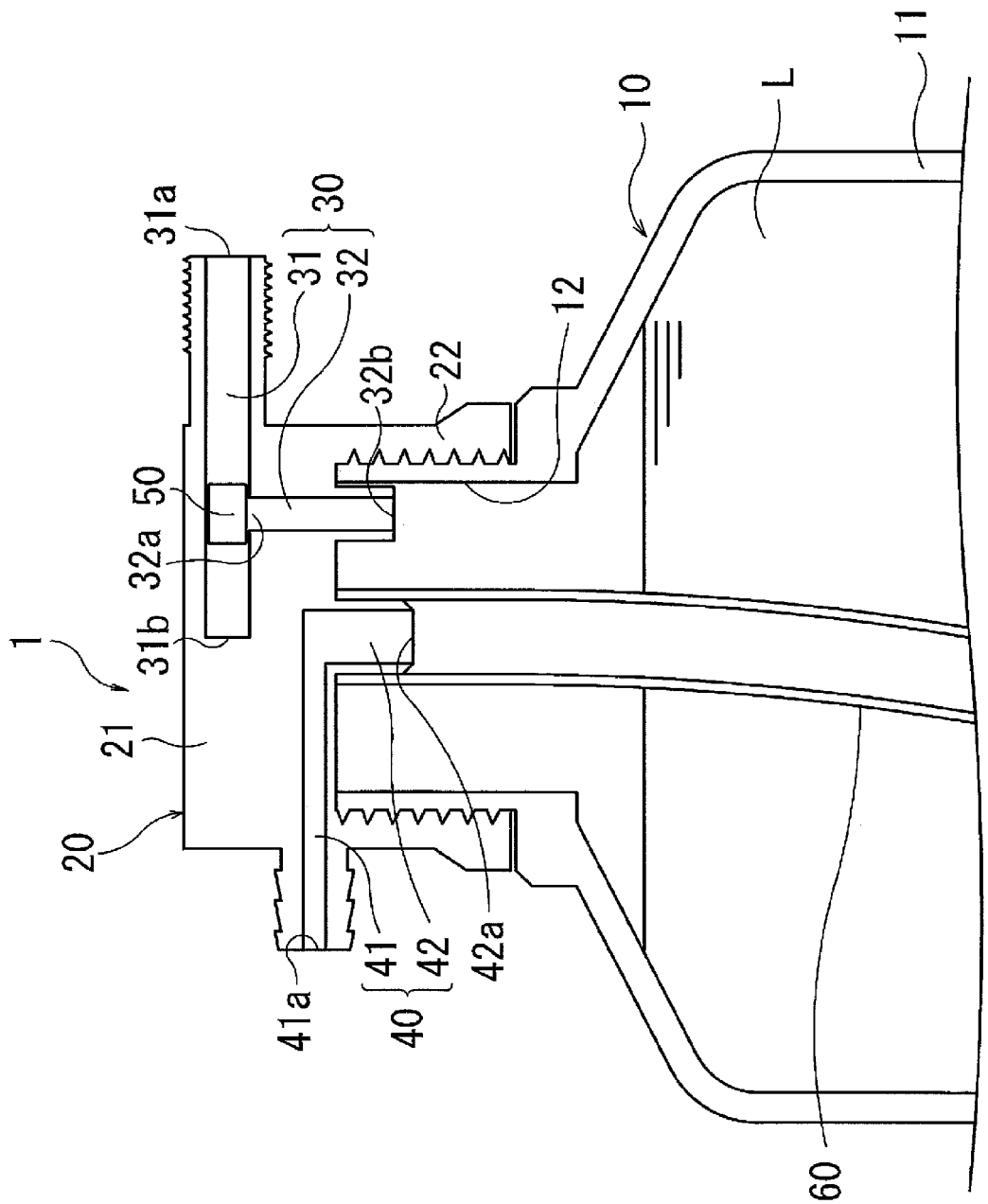
FIG. 3 is an enlarged view near a cap illustrating an example of a condition when the puncture repair liquid holding container in FIG. 1 is closed.
Figure 4:
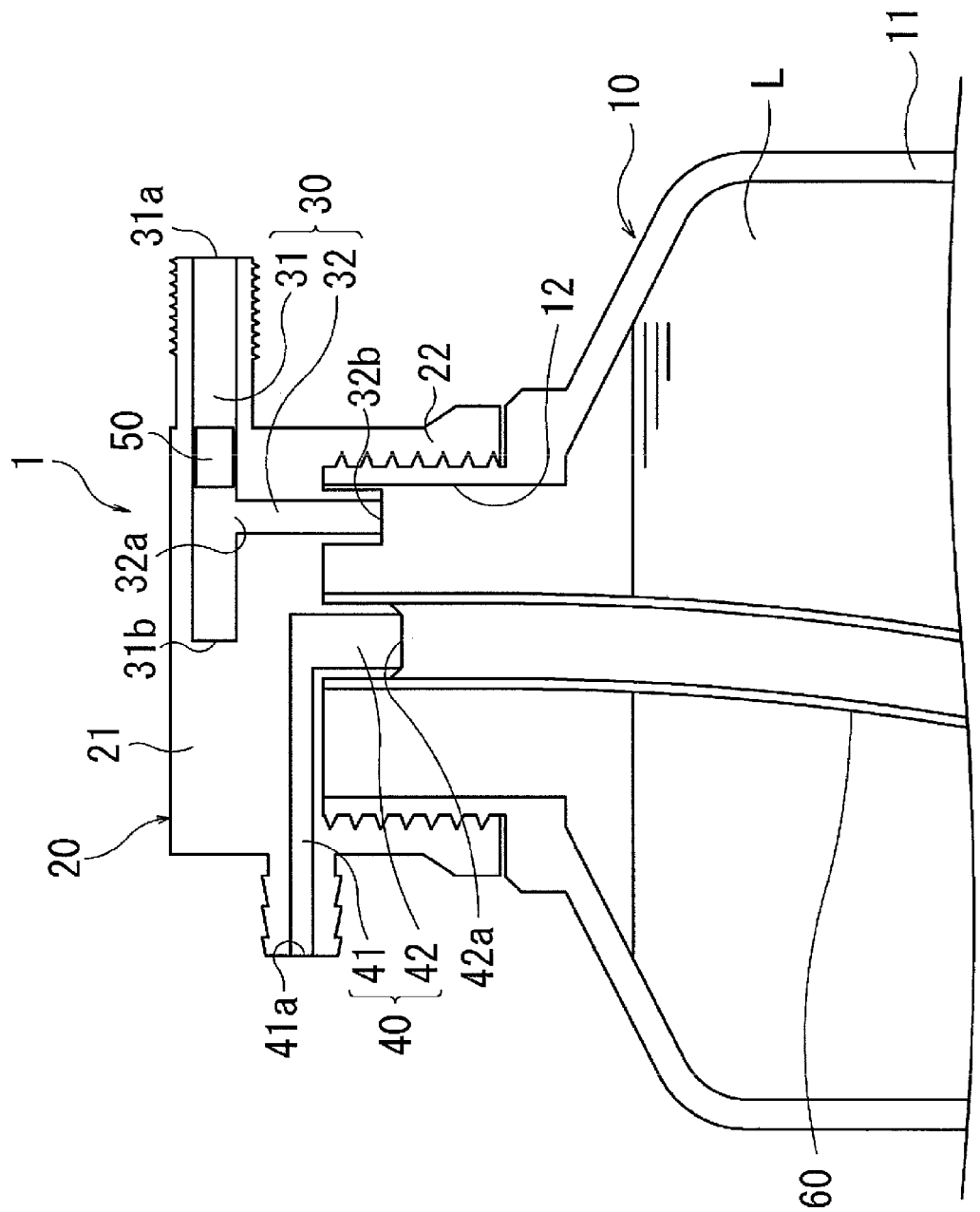
FIG. 4 is an enlarged view near a cap illustrating another example of a condition when the puncture repair liquid holding container in FIG. 1 is closed.
Figure 5:
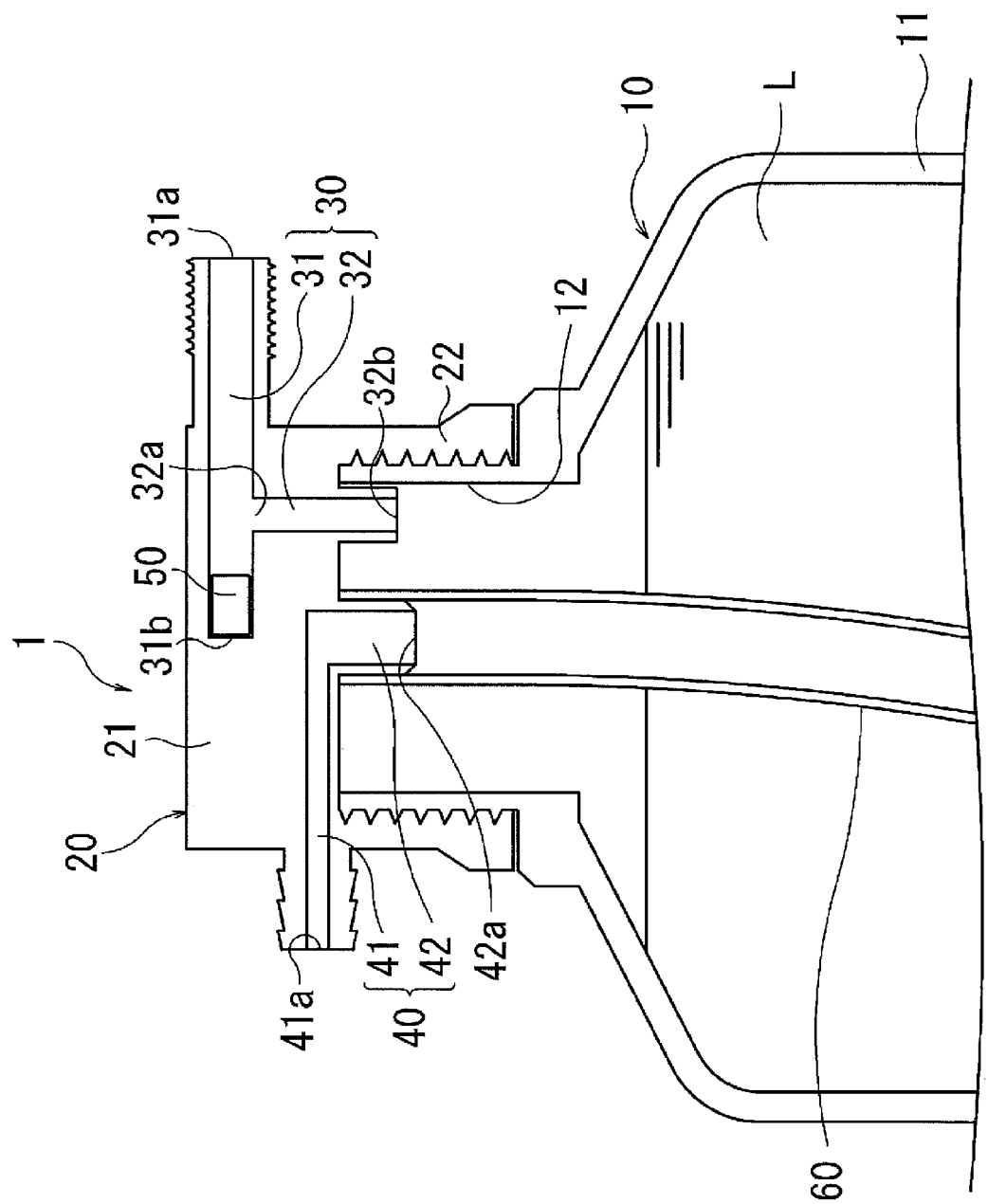
FIG. 5 is an enlarged view near a cap illustrating an example of a condition when the puncture repair liquid holding container in FIG. 1 is opened.

A closing plug 50 having a shape that blocks the straight portion 31 is slidably inserted in the straight portion 31. The closing plug 50 is positioned on the branched portion 32 as illustrated in FIG. 3, or positioned closer to an opening end 31a side of the straight portion 31 than the branched portion 32 as illustrated in FIG. 4 to close the first flow channel 30 (hereinafter, this condition is referred to as a "closed condition"). Furthermore, as illustrated in FIG. 5, the closing plug 50 is positioned closer to the closing end 31b of the straight portion 31 than the branched portion 32 to open the first flow channel 30 (hereinafter, this condition is referred to as an "opened condition"). The repair liquid L is prevented from leaking from the first flow channel 30 in the aforementioned closed condition during storage, and when compressed air is fed from the opening end 31a of the first flow channel 30 (straight portion 31) during puncture repair work, the closing plug 50 is pressed by the pressure and moved to the closing end 31b of the straight portion 31 to switch to the opened condition. Therefore, switching is possible between the closed condition and opened condition based on the position of the closing plug 50, and the closed condition and opened condition have the aforementioned forms, and therefore, the first flow channel 30 can be opened without the closing plug 50 falling into the container main body 10 in the opened condition, while reliably preventing liquid leaking in the closed condition, and the closing plug 50 can be reliably prevented from blocking a flow channel during puncture repair work.

Note that from a different perspective, the structure of the first flow channel 30 can be said to be such that the closing plug 50 that can slide inside a horizontal hole is inserted with regard to an L-shaped flow channel having the horizontal hole (portion of the straight portion 31 from the opening end 31a to the branched portion 32) and a vertical hole (branched portion 32), while a holding portion that can hold the closing plug 50 (portion of the straight portion 31 from the branched portion 32 to the closing end 31b) is provided on an extending position of the horizontal hole, where when the closing plug 50 is present in the horizontal hole, the flow channel is closed, and when the closing plug 50 is pressed into the holding portion by compressed air, the flow channel is opened. In any case, even in the opened condition, the closing plug 50 remains inside the first flow channel 30 (closing end 31b side of the straight portion 31) and is held in a portion that does not inhibit the flow of the repair liquid L (closing end 31b side of the straight portion 31, and from the aforementioned perspective, the holding portion that is different from a flow channel), and therefore, the closing plug 50 can be reliably prevented from blocking the first flow channel 30 during puncture repair work.

The closing plug 50 is preferably configured from an elastomer such as silicon, nitrile rubber (NBR), ethylene propylene diene rubber (EPDM), natural rubber (NR), or the like. Silicon or ethylene propylene diene rubber (EPDM) is particularly preferable. Thereby, the closing plug 50 deforms based on the shape inside the first flow channel 30 (inside straight portion 31), and thus the first flow channel 30 can be reliably closed. Furthermore, even in a case where recesses and protrusions are structurally formed inside the first flow channel 30, deformation can occur based on the recesses and protrusions, which is advantageous for reliably closing the first flow channel 30.

Figure 6A:
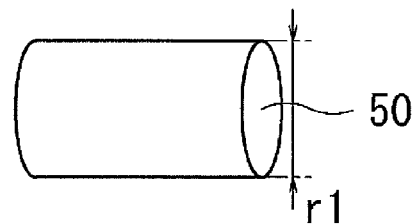
FIGS. 6A to 6E are explanatory diagrams schematically illustrating a closing plug shape.
Figure 6B:
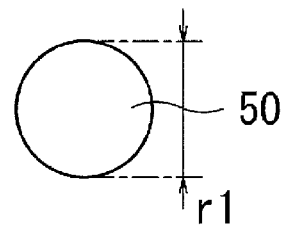

The shape of the closing plug 50 is not particularly limited so long as the straight portion 31 of the first flow channel 30 can be slidably closed. For example, in a case where the straight portion 31 is a cylindrical hole (cross-sectional shape orthogonal in an extension direction is circular), the cross-sectional shape of at least a portion is preferably circular with an outer diameter larger than an inner diameter R1 of the straight portion 31 such that a flow channel can be reliably closed. As specific examples of the shape of the closing plug 50, a cylindrical shape as in FIG. 6A, a spherical shape as in FIG. 6B, and a cylindrical shape having a recessed portion 51 on at least a portion as illustrated in FIGS. 6C to 6E can be preferably used.

At this time, an outer diameter r1 of a maximum diameter portion of the closing plug 50 is preferably 1.05 to 1.20 times the inner diameter R1 of the straight portion 31 of the first flow channel 30. When the outer diameter r1 of the closing plug 50 is less than 1.05 times the inner diameter R1 of the straight portion 31, a space may occur between an inner wall of the straight portion 31 and the closing plug 50, and thus reliably closing the flow channel is difficult. When the outer diameter r1 of the closing plug 50 is greater than 1.20 times the inner diameter R1 of the straight portion 31, the closing plug 50 will be too large with regard to the straight portion 31, and therefore, the closing plug 50 is difficult to move, even in a case where the compressed air is fed during puncture repair work. Furthermore, inserting the closing plug 50 into the straight portion 31 is difficult when manufacturing the cap 20.

Figure 6C:
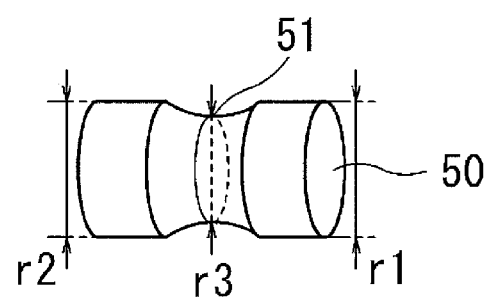
Figure 6D:
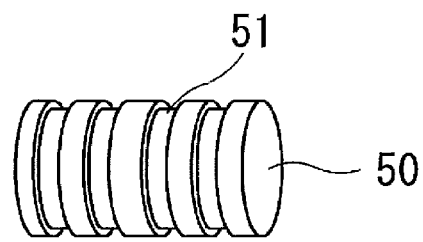
Figure 6E:
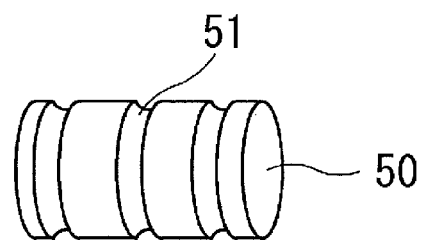

In particular, as illustrated in FIGS. 6C to 6E, when the closing plug 50 has a cylindrical shape having the recessed portion 51 on at least a portion, reliable closing of a flow channel is possible by having a sufficient thickness in the extension direction of the straight portion 31, and the contact area of the closing plug 50 with regard to the straight portion 31 can be reduced by the recessed portion 51, and therefore, the closing plug 50 can smoothly sliding inside the straight portion 31. At this time, when the opening end 31a of the straight portion 31 is a maximum diameter (outer diameter is r1) of the closing plug 50, the closing plug is more likely to catch compressed air during puncture repair work, which is advantageous for opening a flow channel by compressed air. Furthermore, the outer diameter r1 of the closing plug 50 on the opening end side 31a of the straight portion 31, an outer diameter r2 of the closing plug 50 on the closing end side 31b of the straight portion 31, and an outer diameter r3 of the closing plug 50 on the recessed portion 51 preferably satisfy the relationship r1≥r2≥r3. Thereby, r2 is r1 or smaller, and therefore, both closing performance of a flow channel and sliding ease can be established, and in particular, in a case where r2 is smaller than r1, the closing plug 50 will have a tapered shape with regard to an advancement direction, and therefore will easily slide by compressed air. Note that in FIGS. 6C to 6E, a right side of the drawings is the opening end 31a side of the straight portion 31, and a left side of the drawings is a closing end 31b side of the straight portion 31.

The outer diameters r1, r2, and r3 preferably satisfy the aforementioned magnitude relationship, but more preferably, r2 is 95% to 100% of r1, and r3 is 80% to 90% of r2. By setting in the range, the shape of the closing plug 50 can be optimized, and both closing performance of a flow channel in the closed condition and ease of switching from the closed condition to the opened condition (sliding ease of the closing plug 50) can be established to a high degree.

The closing plug 50 can be positioned above the branched portion 32 as illustrated in FIG. 3, or positioned closer to the opening end 31a side of the straight portion 31 than the branched portion 32 as illustrated in FIG. 4 to close the first flow channel 30, but more preferably, the closing plug 50 is positioned above the branched portion 32 in the closed condition as illustrated in FIG. 3 to close the connecting end 32a of the branched portion 32, regardless of the shape of the closing plug 50. Thereby, in a case where the internal pressure of the container increases due to a temperature change or the like during storage, the increased internal pressure of the container is applied upward from below the closing plug 50 through the branched portion 32, and therefore, the closing plug 50 moves to an opening end 31a side of the straight portion 31 due to the pressure, and thus closing of the first flow channel 30 by the closing plug 50 can be prevented from being inhibited.

Figure 7:
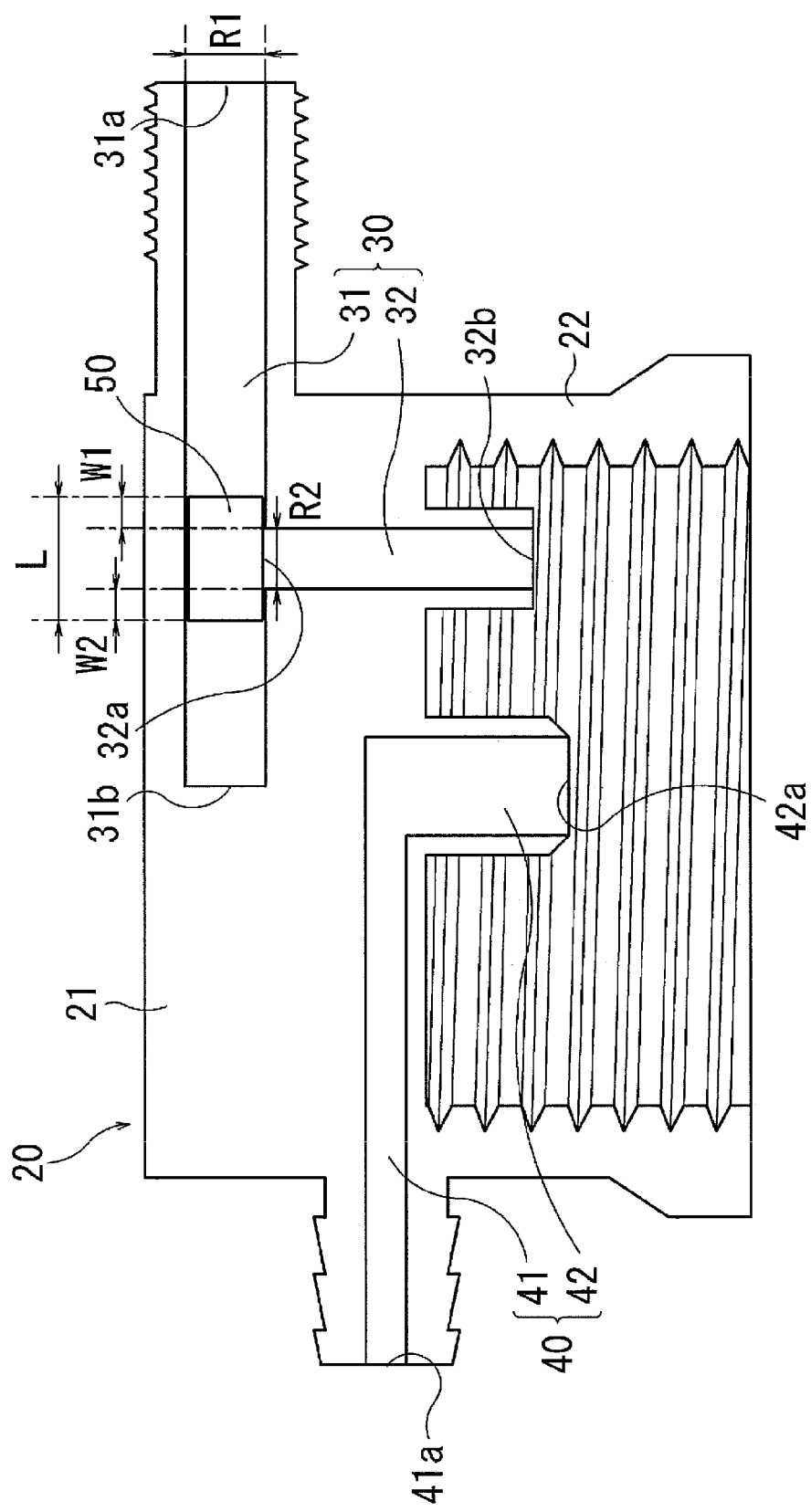
FIG. 7 is a cross-sectional view describing the dimensions of a first flow channel and closing plug.

In the closed condition, the closing plug 50 is positioned above the branched portion 32 to close the connecting end 32a of the branched portion 32, and therefore, a length L of the closing plug is preferably longer than an opening diameter R2 of the branched portion 32 to the straight portion 31 as illustrated in FIG. 7. Specifically, the length L of the closing plug 50 is preferably set to 1.10 times to 2.00 times the opening diameter R2 of the branched portion 32 to the straight portion 31. By setting the length L of the closing plug 50, the closing plug 50 can be disposed so as to straddle the connecting end 32a of the branched portion 32, which is advantageous for achieving the aforementioned effects.

Furthermore, in the closed condition, a protrusion length W1 of a portion protruding more to the opening end 31a side of the straight portion 31 than the branched portion 32 of the closing plug 50 and the protrusion length W2 of a portion protruding more to the closing end side 31b of the straight portion 31 than the branched portion 32 of the closing plug 50 preferably satisfy the relationship W1≥W2. Thereby, the position of the closing plug 50 with regard to the branched portion 32 in the closed condition is optimized, the closing plug 50 moves to the opening end 31a side of the straight portion 31 om a case where the internal pressure of the container increases due to temperature change or the like during storage, and thus closing of the first flow channel 30 by the closing plug 50 can be reliably prevented from being inhibited.

In any case, when a pressure of 150 kPa to 300 kPa is applied, the closing plug 50 preferably moves inside the straight portion 31 such that the first flow channel 30 is opened. Thereby, a flow channel can be reliably closed during storage, and the flow channel can be easily opened during puncture repair.

In FIGS. 1 to 5, the second flow channel 40 forms an L shape that includes a horizontal hole portion 41 extending orthogonal to an axis of the container 1 and a vertical hole portion 42 extending in an axial direction of the container 1. An end portion (opening end 41a) on one side of the horizontal hole portion 41 opens outside the container, and the opening end 41a protrudes from the base portion 21. An end portion on another side of the horizontal hole portion 41 connects with the vertical hole portion 42 to form a bent portion. An end portion (opening end 42a) on one side of the vertical hole portion 42 opens toward the inside of the container main body, and the opening end 42a protrudes toward the inside of the container main body 10. An end portion on another side of the vertical hole portion 42 connects with the horizontal hole portion 41 to form a bent portion. In the examples illustrated in the drawings, a tube 60 extending toward the inside of the container main body 10 is attached to the opening end 42a of the vertical hole portion 42. The tube 60 is configured from polyvinyl chloride and soft polyethylene, for example, and extends to the vicinity of a bottom surface of the container main body 10 (holding portion 11).

A tip of the tube 60 is sealed by a sealing film 61 with an elongation at break of 100% to 300%, for example, and the repair liquid L is prevented from leaking from the second flow channel 40 during storage. At this time, the elongation at break of the sealing film 61 is from 100% to 300%, and therefore, a sealed condition can be maintained when the internal pressure changes due to temperature change during storage, and the sealing film 61 can break due to the internal pressure of the container increased when compressed air is fed into the container 1 by a high pressure air feeding device during puncture repair work, and thus the second flow channel 40 can be opened. At this time, when the elongation at break of the sealing film 61 is less than 100%, the sealing film 61 may break based on the extent that the container internal pressure changes due to temperature change or the like during storage. When the elongation at break of the sealing film 61 is greater than 300%, the sealing film 61 might not break even in a case where compressed air is fed to increase the container internal pressure.

A resin film can be used as a material of the sealing film 61, for example. In particular, a resin film subjected to a stretching treatment in one direction has properties where tearing is easy but breaking is difficult, and therefore can be preferably used. The sealing film 61 including the resin film can be attached to a tube tip by a method such as ultrasonic welding, caulking, or the like. The thickness of the sealing film 61 can be approximately 0.1 mm to 1.0 mm, for example. Note that in order to reliably break the sealing film 61, a piercing member (not illustrated in the drawings) for breaking the sealing film 61 may be provided near the sealing film 61 inside the tube 60.

The sealing film 61 that seals the second flow channel 40 preferably breaks when the container internal pressure reaches 200 kPa to 350 kPa such that the second flow channel 40 opens. Thereby, a flow channel can be reliably closed during storage, and the flow channel can be easily opened during puncture repair.

As illustrated in FIG. 2, in a case where the first flow channel 30 is closed by the closing plug 50, and the second flow channel 40 is closed by the sealing film 61, when compressed air at 150 kPa to 300 kPa is fed into the container 1 in the closed condition through the hose H1, for example, first, the closing plug 50 moves to the closing end 31b side of the straight portion 31 of the first flow channel 30 such that the first flow channel 30 opens. Thereby, the compressed air is fed into the container 1 through the first flow channel 30 such that the container internal pressure gradually increases. Furthermore, when the container internal pressure reaches 200 kPa to 350 kPa, for example, the sealing film 61 sealing the second flow channel 40 breaks such that the second flow channel 40 opens. As a result, the repair liquid L is discharged through the opened second flow channel 40 and is fed into the punctured tire through the hose H2. The container 1 is opened in this manner, and thus even in the opened condition, the closing plug 50 remains inside the first flow channel 30 (closing end 31b side of the straight portion 31) and is held in a portion that does not inhibit the flow of the repair liquid L (closing end 31b side of the straight portion 31), and therefore, the closing plug 50 can be reliably prevented from blocking the first flow channel 30 during puncture repair work.

The invention claimed is:

1. A puncture repair liquid holding container formed from: a container main body provided with a holding portion where puncture repair liquid is held, and an opening portion; and a cap attached to the opening portion, the puncture repair liquid holding container comprising:
    a first flow channel for the cap to introduce compressed air from outside the container; and
    a second flow channel for discharging the puncture repair liquid inside the container; wherein
    the first flow channel is configured from a straight portion and a branched portion, the straight portion is provided with an opening end for opening to the outside of the container and a closing end for ending at the inside of the cap, the branched portion is provided with a connecting end for connecting a middle portion of the straight portion and an opening end facing towards the inside of the container main body, a closing plug having a shape that blocks the straight portion is slidably inserted in the straight portion, and switching is possible between a closed condition where the closing plug is positioned above the branched portion or closer to an opening end side of the straight portion than the branched portion such that the first flow channel is closed, and an opened condition where the closing plug is positioned more to a closing end side of the straight portion than the branched portion such that the first flow channel is opened; and
    the closing plug forms a cylindrical shape having at least one recessed portion at a middle portion, and an outer diameter r1 of the closing plug on an opening end side of the straight portion, an outer diameter r2 of the closing plug on a closing end side of the straight portion, and an outer diameter r3 of the closing plug on the recessed portion satisfy a relationship $r1 \geq r2 \geq r3$.

2. The puncture repair liquid holding container according to claim 1, wherein the closing plug is configured from an elastomer.

3. The puncture repair liquid holding container according to claim 1, wherein a length L of the closing plug is longer than an opening diameter of the branched portion to the straight portion, and in the closed condition, the closing plug is positioned above the branched portion and the connecting end of the branched portion is blocked.

4. The puncture repair liquid holding container according to claim 3, wherein in the closed condition, a protrusion length W1 of a portion protruding more to an opening end side of the straight portion than the branched portion of the closing plug and a protrusion length W2 of a portion protruding more to a closing end side of the straight portion than the branched portion of the closing plug satisfy a relationship W1≥W2.

5. The puncture repair liquid holding container according to claim 1, wherein a tube extending toward the inside of the container main body is attached to the second flow channel, and the tube is sealed by a sealing film with an elongation at break of 100% to 300%.

6. The puncture repair liquid holding container according to claim 2, wherein a length L of the closing plug is longer than an opening diameter of the branched portion to the straight portion, and in the closed condition, the closing plug is positioned above the branched portion and the connecting end of the branched portion is blocked.

7. The puncture repair liquid holding container according to claim 6, wherein in the closed condition, a protrusion length W1 of a portion protruding more to an opening end side of the straight portion than the branched portion of the closing plug and a protrusion length W2 of a portion protruding more to a closing end side of the straight portion than the branched portion of the closing plug satisfy the relationship W1≥W2.

8. The puncture repair liquid holding container according to claim 7, wherein a tube extending toward the inside of the container main body is attached to the second flow channel, and the tube is sealed by a sealing film with an elongation at break of 100% to 300%.

\* \* \* \* \*